May 27, 1958  H. BENJAMIN  2,836,389
ROTARY PLUG VALVE RETAINING MEANS
Original Filed June 5, 1952

HARRY BENJAMIN   INVENTOR.

BY
William H Brown
Atty

United States Patent Office 2,836,389
Patented May 27, 1958

2,836,389

ROTARY PLUG VALVE RETAINING MEANS

Harry Benjamin, Cleveland, Ohio, assignor to The Harshaw Chemical Company, Elyria, Ohio, a corporation of Ohio Original application June 5, 1952, Serial No. 291,877, now Patent No. 2,741,452, dated April 10, 1956. Divided and this application September 6, 1955, Serial No. 532,699

2 Claims. (Cl. 251—183)

This invention relates to valves, more especially to valves having tapered rotatable elements and means for holding such elements against accidental removal from the valve body. More specifically, the invention relates to stopcocks of the type used on burettes, separatory funnels and similar laboratory equipment, ordinarily composed of glass and having a ground fit between the valve body and the rotor, the present invention having more specific reference to means for preventing the rotor from being removed accidentally from the valve body.

The principal object of the present invention is to provide simple and effective means for holding valve rotors of the type indicated. A further object is to provide such a holding means which will offer very little resistance to the rotation of the valve rotor and which will be sufficiently resistant to removal to minimize the chance of accidental failure to function while at the same time permitting intentional removal. A further object is to provide simple and effective means for holding valve rotors of the character indicated which will require no change in standard construction of the valve rotor, it being understood that standard construction consists in a circumferentially grooved extension at the smaller end of the tapered rotor beyond the valve body.

With the foregoing and other objects in view, the invention consists in all the novel features of construction hereinafter described and claimed.

Figure 1:
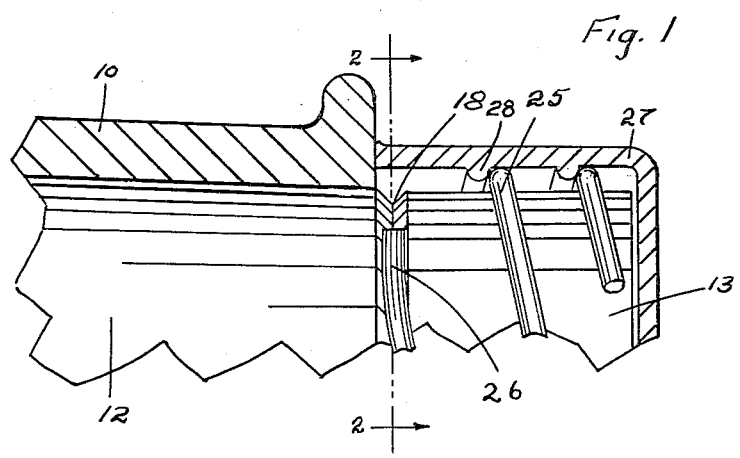
Fig. 1 is a fragmentary sectional view of a standard form of valve construction showing a holding device according to the invention in position of use.
Figure 2:
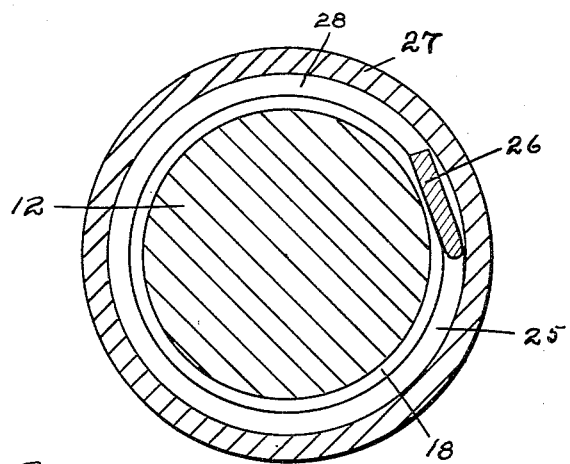
Fig. 2 is a transverse sectional view corresponding approximately to the line 2—2 of Fig. 1.

Referring now to the drawings, it will be seen that the valve body 10 is provided with the standard form of rotor 12 having a projection 13 in which is formed the standard groove 18. Received on the projection 13 is a wire helix 25 having at its inner end all or a portion of a convolution bent down to lie in the groove 18 as indicated at 26. The end of the helix 25 having the bent-in portion serves the function of a resilient holding element while the remainder serves the function of a thread. Received over the helix 25 is an internally threaded sleeve 27 having its thread 28 cooperating with the major portion of the helix 25 which acts as a thread. The helix is resilient and of suitable size to give the necessary resistance to deformation and will function to yieldingly urge the sleeve 27 against the valve body 10. It will be noted that the inner end of the sleeve 27 is of an internal diameter to confine the bent-in portion 26 of the helix 25 in the groove 18, thus preventing axial motion of the helix 25 with respect to the valve rotor (neglecting the small motion permitted by deformation of the helix) except by prior axial motion of the sleeve 27 in a direction to uncover said portion 26 of the helix 25. The sleeve 27 preferably should be composed of material having low frictional characteristics but may be composed of metal or any other suitable material. It may be desirably composed of such materials as ethylene polymer, tetrafluorethylene polymer, abrasive free rubber or the like.

The principal feature of this invention is the use of a resilient wire helix in such manner that a portion acts as a thread for holding the sleeve and another portion engages the standard groove for holding the lock in place and, due to its resilience, permits a yielding engagement of the sleeve against the valve body. Also, the internal thread on the sleeve should terminate short of the groove, and the internal diameter of the sleeve in the region between the thread and the groove should be as large as the outside diameter of the helix, so that a portion of the helix may flexibly connect the portion which is bent into the groove 18 with the portion which acts as a thread.

This application is a division of my copending application Serial No. 291,877, filed June 5, 1952, which matured into Patent No. 2,741,452.

Having thus described my invention, what I claim is:

1. In a device of the class described, a valve body having a conical opening, a tapered valve rotor, said rotor being received in said conical opening and being rotatable therein about its axis between open and closed positions, said rotor having at its smaller end a cylindrical projection extending beyond said valve body, said projection being provided with an annular groove extending therearound at a point adjacent to said valve body, a rotor holding device including a resilient, helical member mounted upon said projection and a sleeve engaging against said valve body, said sleeve having an internal thread and said resilient, helical member comprising a resilient wire helix having a portion surrounding said projection, received in said thread and slidable upon said projection when flexed, the terminal portion of said helix nearest said valve body being bent inwardly toward the axis of said helix and received in said groove, said portions of said helix being continuous with each other, the internal diameter of said helix being at least as great as the external diameter of said projection whereby to be slidable thereon and the internal diameter of said sleeve being such as to confine the inwardly bent portion of said helix against escape from said groove when said sleeve is in contact with said valve body.

2. The device as defined in claim 1 wherein further the said thread terminates short of said groove leaving a portion of said sleeve nearest said valve body free from internal threads whereby a portion of said helical member is slidable on said projection and is slidable within said sleeve, whereby the end portion of said helix which is bent inwardly serves to anchor that end of the helix with respect to the valve rotor and whereby the other end of the helix holds said sleeve and an intermediate portion of said helix is free to function as a movable, resilient connection between the two ends thereof.

References Cited in the file of this patent

UNITED STATES PATENTS 1,820,644    Bach ------------------ Aug. 25, 1931

FOREIGN PATENTS 20,292    Great Britain ---------------- of 1906